(12) United States Patent
Söderman

(10) Patent No.: US 6,558,292 B1
(45) Date of Patent: May 6, 2003

(54) METHOD AND DEVICE FOR CONTROLLING AN INTERNAL COMBUSTION ENGINE

(75) Inventor: Göran Söderman, Nykvarn (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/868,457

(22) PCT Filed: Dec. 13, 1999

(86) PCT No.: PCT/SE99/02326
§ 371 (c)(1),
(2), (4) Date: Sep. 24, 2001

(87) PCT Pub. No.: WO00/35702
PCT Pub. Date: Jun. 22, 2000

(30) Foreign Application Priority Data

Dec. 16, 1998 (SE) .............................................. 9804342

(51) Int. Cl.⁷ ............................................... B60K 41/02
(52) U.S. Cl. .......................................................... 477/78
(58) Field of Search ............................................ 477/78

(56) References Cited

U.S. PATENT DOCUMENTS

| | | | | |
|---|---|---|---|---|
| 4,698,763 A | * | 10/1987 | Smyth | 477/78 |
| 4,817,776 A | * | 4/1989 | Tateno et al. | 477/78 |
| 4,852,006 A | * | 7/1989 | Speranza | 477/78 |
| 5,081,583 A | * | 1/1992 | Kono | 477/78 |
| 5,095,434 A | * | 3/1992 | Lupo et al. | 477/78 |
| 5,569,115 A | * | 10/1996 | Desautels et al. | 477/110 |

FOREIGN PATENT DOCUMENTS

| | | |
|---|---|---|
| EP | 0873902 | 10/1998 |
| WO | 9102662 | 3/1991 |
| WO | 9704982 | 2/1997 |

\* cited by examiner

Primary Examiner—Dirk Wright
(74) Attorney, Agent, or Firm—Ostrolenk, Faber, Gerb & Soffen, LLP

(57) ABSTRACT

In a vehicle's driveline, the clutch between drive engine and gearbox has the task of ensuring a final speed adjustment between the engine and the gearbox at the time when the clutch pedal is allowed to rise on completion of a gear change. The invention has the object of reducing the stress on the clutch and the disadvantages which arise from a lengthy sliding-in process with large speed differences. This is achieved by adjusting the engine speed to the gear being engaged, so that only a small speed difference has to be absorbed in the clutch.

15 Claims, 3 Drawing Sheets

METHOD AND DEVICE FOR CONTROLLING AN INTERNAL COMBUSTION ENGINE

FIELD OF TECHNOLOGY

The present invention relates to a method and an arrangement in accordance with the preambles to patent claims 1 and 6 respectively.

STATE OF THE ART

When driving a heavy vehicle, such as a truck or a bus, provided with a mechanical gearbox and a mechanical clutch, e.g. of disc type, changing down to lower gears is particularly problematical. Depressing the clutch pedal at the time of gear changing results in the engine speed decreasing quickly when the accelerator pedal is released, partly because of the internal friction in the engine. A large number of successive gear changes further reduces the engine speed to idling speed.

Consequently, after the gear change has taken place, the engine has to be speeded up again, which is typically accomplished by the driver allowing the clutch pedal to rise so that the engine is speeded up by being connected to the driveline. Engine speed adjustment is thus brought about via the sliding connection with the gearbox, the final gear and the drive wheels.

A disadvantage of the state of the art is that the sometimes large speed differences and masses involved in such speed adjustment cause considerable clutch wear, even in normal gear changes during normal driving, owing to the aforesaid engine speed reduction when gear changing is initiated. In addition, there is loading of all the other parts of the driveline and inducing of oscillations in the driveline. These result in inferior comfort because of disturbing noise and physical vibration in the vehicle, which is particularly troublesome if the vehicle is a bus.

OBJECTS OF THE INVENTION

One object of the present invention is to eliminate the problems of the state of the art. This is achieved in a method and an arrangement of the kind mentioned in the introduction by means of the features indicated in the characterising parts of patent claims 1 and 6 respectively.

It entails using simple means for preventing the undesirable drop in engine speed at the time of clutch disengagement, thereby enabling substantial reduction in clutch loading and wear and in the corresponding loading of other driveline components. Further advantages which may be indicated include simplified driving of a vehicle which is equipped in accordance with the invention, and increased comfort, which is particularly advantageous in buses but is also significant for other types of heavy vehicles. Equipping the vehicle additionally with a hydrodynamic supplementary brake, a so-called retarder, connected to the gearbox results in further advantages in that the retarder cooling, shared with the engine cooling, is maintained at a higher level by means of an arrangement according to the invention than would otherwise be the case upon engine speed reduction. A system according to the invention thus prevents the risk of coolant boiling in the retarder and makes it possible to dimension the cooling arrangement so that the latter need not operate with the excessive and almost momentary additional heat which may otherwise occur on completion of a gear change procedure. It should be mentioned here that in normal driving it is in principle never, or at least extremely rarely, desirable for the engine speed to be reduced to idling speed.

Regarding the indication of the clutch being disengaged, it may be stated that sensors for emitting such signals are already known but are conventionally designed, for example, to communicate with a road speed maintainer and/or to make changeover possible in any split gearbox fitted. Such conventional sensors may nevertheless be used in the invention.

The invention is applicable both in purely mechanical gearboxes with mechanical linkages and in servo-assisted gearboxes. Relevant gearboxes include a main gearbox and also, where applicable, a split and/or range gearbox or the like.

Engine speed control systems are already known and will not be described here.

Advanced control systems have recently been developed which adapt the engine speed to the input speed of a gearbox unit on the basis of a number of sensors situated at various points in the driveline, but these systems are applied in such a way that the clutch is not used in normal driving and the speed adjustment is designed to be so accurate that a gear changeover can be initiated directly without operating the clutch. Such sophisticated control systems are relatively expensive, however, since they require a more complex structure as regards both the components involved and the software programming of the control system. With the system according to the present invention, engine speed adjustment or maintenance is initiated by the driver operating an entirely manual or a servo-assisted clutch, but the clutch is otherwise used in a conventional manner. The advantage of the present invention is thus that it avoids the speed decrease which occurs with conventional systems, and hence also avoids the problems associated with the latter. The invention may thus be used at relatively low cost and in a simple manner without the control system becoming complex.

The driving data which may require observation and recording include acceleration, vehicle speed, engine speed, power mobilisation and torque extraction. Depending on the application, the system may be designed to observe some or all of these driving parameters to provide the basis for estimating, when the driver disengages the clutch, an engine speed which is at least in the vicinity of the actual engine speed after the gear change has taken place.

Further advantages are achieved by the features in the other patent claims and will be described below.

DESCRIPTION OF THE DRAWINGS

The invention will now be described in more detail on the basis of an embodiment and with reference to the attached drawings, in which.

DESCRIPTION OF AN EMBODIMENT

This description exemplifies the use of the invention in a vehicle, such as a heavy-duty truck or a bus, in which a combustion engine is used as drive engine for the vehicle, and the vehicle's driveline incorporates a clutch between the engine and the gearbox. The engine may for example take the form of a diesel engine.

Figure 1:
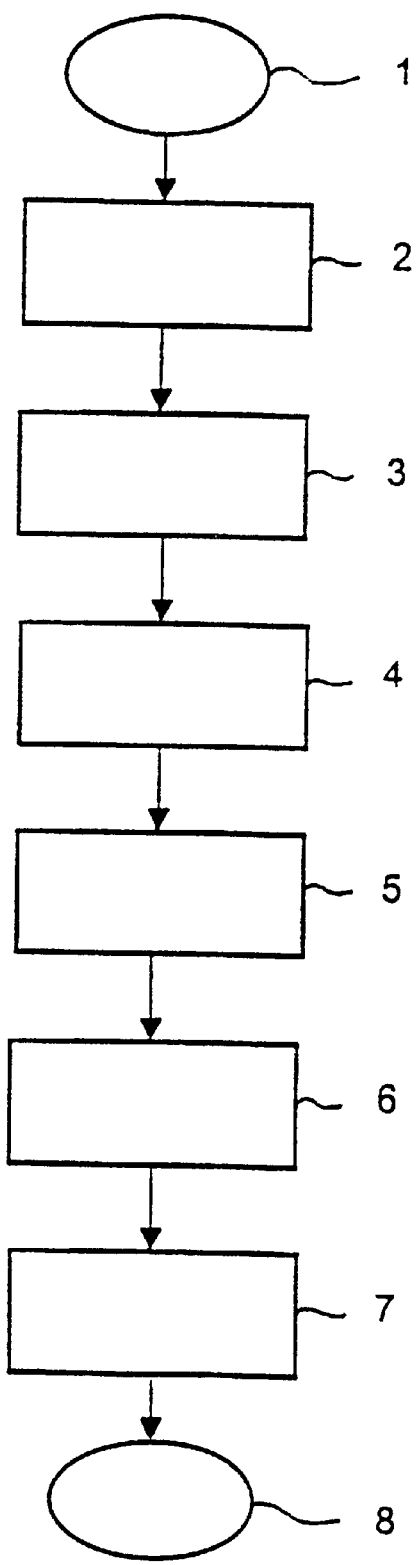
FIG. 1 depicts schematically a flow diagram of a method according to the invention.

FIG. 1 shows a flow diagram of a method according to the invention in which reference 1 denotes the start of the sequence. Reference 2 represents the observation of driving parameters such as acceleration, vehicle speed, engine speed, power mobilisation and torque extraction, and reference 3 the recording of relevant driving parameter data, e.g. driving data during the most recent minutes, which are continuously updated in a memory belonging to the system. Reference 4 represents the detection of a break in the driveline, e.g. in the form of disengagement of a disc clutch, and the generating and emission of a first signal which is indicative thereof. Reference 5 denotes the calculation of a desired engine speed on the basis of relevant driving data, thereby making it possible to estimate an expected change in the driving configuration, e.g. an expected upward gear change, an expected downward gear change etc., on the basis of data on, for example, torque extraction, acceleration, vehicle speed, engine speed and/or power mobilisation. Also generated and emitted is a control signal which describes said desired engine speed and is transmitted to a system for controlling the engine. Reference 6 denotes the action of the engine control system on the engine to achieve the desired engine speed, such as mobilisation of power to achieve the desired engine speed. Reference 7 represents the detection of reconnection of the driveline, and reference 8 denotes the end of the sequence.

Figure 2:
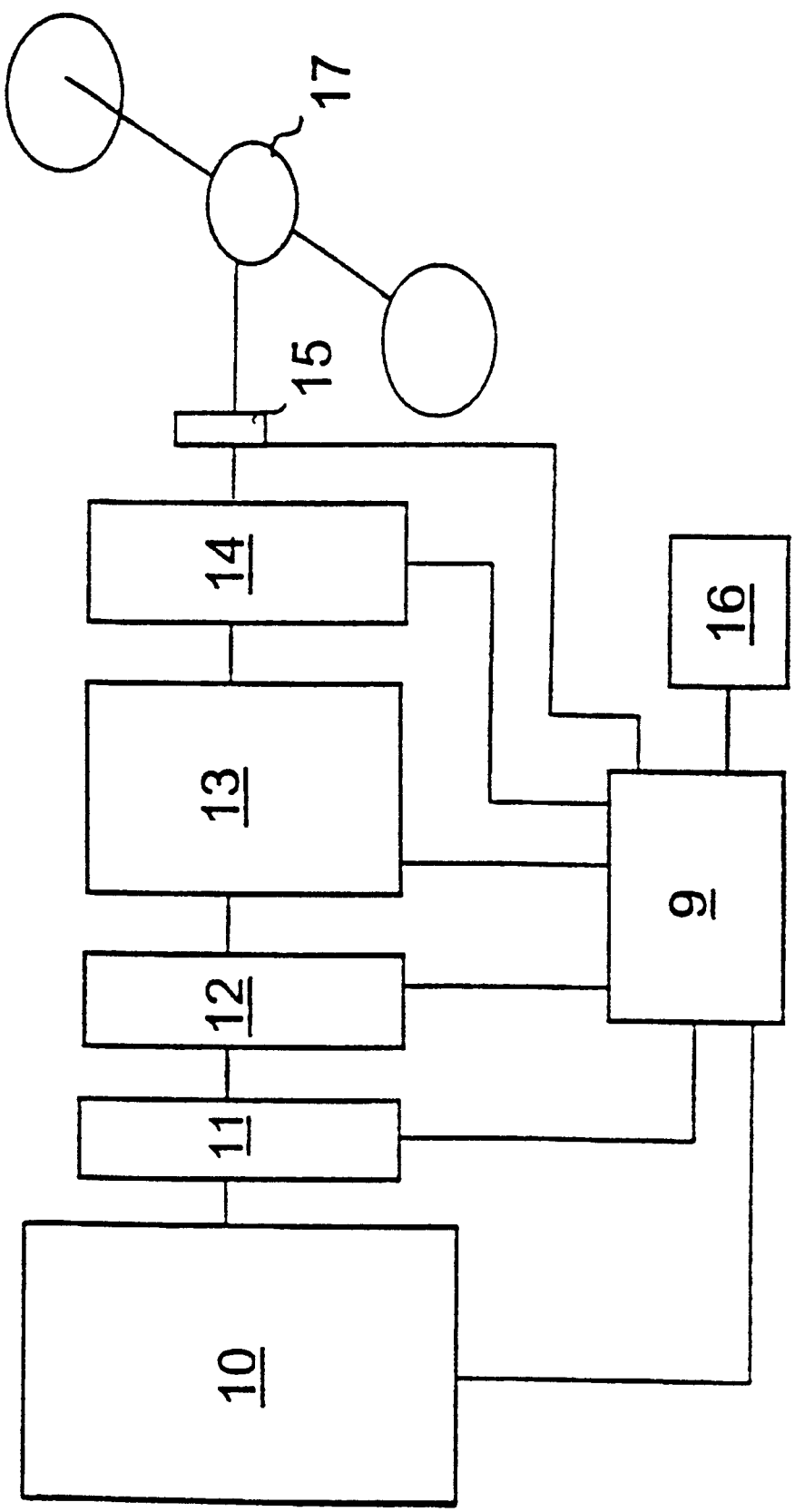
FIG. 2 depicts schematically the control system, including a system according to the invention, in a driveline for a heavy vehicle.

FIG. 2 depicts schematically the control system 9, which advantageously incorporates a system according to the invention integrated into or connected to the normal engine control system. Reference 16 denotes a memory for the recording of driving parameters which are relevant in connection with the present invention. In the driveline, the engine is denoted by reference 10, the clutch by 11 and the gearbox, which in this example comprises three parts, by 12, 13 and 14, while a speed sensor for the output speed is denoted by 15. Reference 17 represents the final gear. The diagram shows the control system communicating with the engine, with the clutch, with the sensor 15 for the output shaft and with the memory 16.

Figure 3:
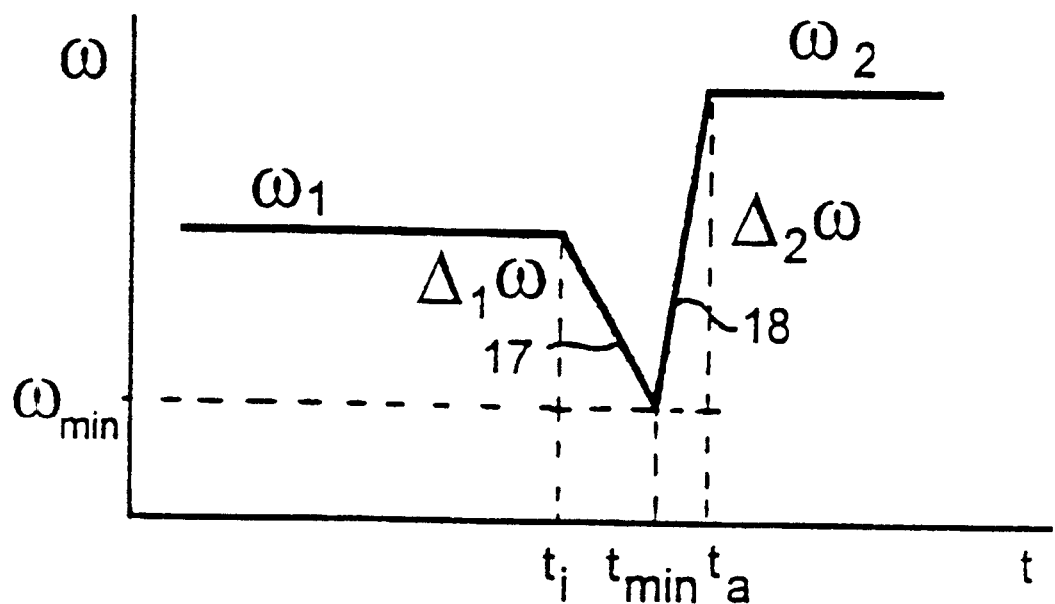
FIG. 3 depicts schematically the changes in engine speed during a conventional gear change sequence.

FIG. 3 depicts in diagram form the engine speed $\omega$ as a function of time t in a conventional gear change process in which $\omega_1$ represents the engine speed before the gear change and $\omega_2$ the engine speed after the gear change. At time $t_i$ a gear change sequence is initiated by the driver depressing a clutch pedal. At the same time, the driver releases the accelerator pedal, resulting, during the curved section 17, in the engine speed being quickly reduced by $\Delta_1\omega$ to a minimum speed value $\omega_{min}$ at time $t_{min}$. At that time, the driver changes the gear or gears in the gearbox and starts letting the clutch pedal rise, which means that there has to be speed adjustment between $\omega_{min}$ and $\omega_2$, i.e. along the curve 18 and amounting to $\Delta_2\omega$ in the diagram to the completion time $t_a$.

Figure 4:
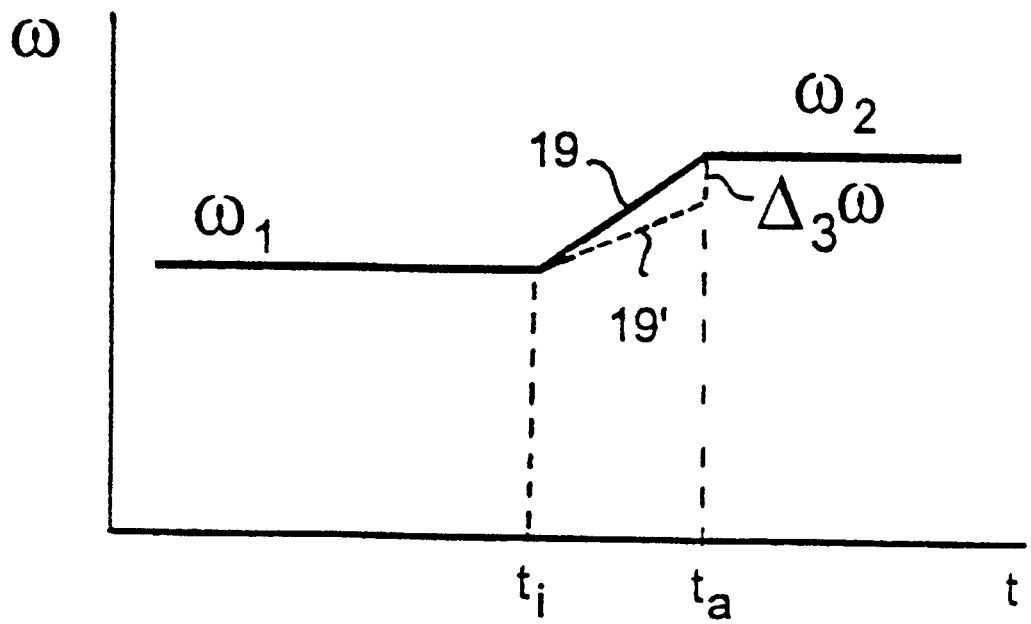
FIG. 4 depicts schematically the pattern of engine speed during a gear change sequence applying a system according to the invention.

FIG. 4 shows a corresponding gear change sequence in a system applying the present invention. In the same way as in FIG. 3, the engine speed is increased from $\omega_1$ to $\omega_2$, but in this case, owing to the system according to the invention, the control system predicts from relevant driving data an engine speed increase after the gear change so that in the ideal case (represented by the unbroken line at 19) the speed prevailing upon completion of the gear change is exactly that required. Usually, however, there is a certain deviation between the engine speed desired by the control system and $\omega_2$, as illustrated by broken lines at 19' in FIG. 4, resulting in a certain engine speed difference $\Delta_3\omega$ upon completion of the gear change at time $t_a$.

This means that a speed adjustment amounting to $\Delta_3\omega$ is required between the engine and the remainder of the driveline, and this is usually achieved by the driver allowing the clutch pedal to rise.

It should be noted that the invention is applicable to both upward gear changes and downward gear changes and is useful in all types of gear change processes. FIG. 4 thus shows two examples of speed increase by means of the control system and this is preferred in downward gear changes, but maintaining constant speed upon detection of the break in the driveline is also advantageous, with reference to FIG. 3, and in such cases only a speed adjustment corresponding to the difference between $\omega_2$ and $\omega_1$ would have to be taken care of by the clutch.

To allow engine speed reduction on the occasion, for example, of a shorter or longer stop, the system applying the method according to the invention is advantageously designed to detect that no normal gear change procedure occurs and hence to allow the engine speed to drop, e.g. to idling speed. This may be achieved by means of a time circuit which disconnects the system and ensures that the engine speed is reduced after a predetermined period of time.

The invention may in alternative embodiments be modified in whole or in part from what is indicated in the foregoing example. Although the invention exhibits the greatest advantages when used in heavy-duty vehicles, such is not necessarily its only possible area of use. The invention may thus be applied in other types of vehicles, e.g. in ordinary passenger cars, and the engine may be of another known type, e.g. an Otto engine.

What is claimed is:

1. A method for controlling the engine speed of a combustion engine of a vehicle, wherein the vehicle includes a combustion engine, a mechanical gearbox, a driveline between the engine and the gearbox and a manually operable clutch including in the driveline, the method comprising detecting and recording driving parameter data for operation of the vehicle and the engine thereof;

breaking the driveline connection between the engine and the gearbox by disconnecting the clutch, detecting the disconnection of the clutch and generating a first signal indicative of the disconnection of the clutch;

determining a desired engine speed which is desired to exist upon completion of a gear change, the determining is initiated by the first generated signal and the determining is based upon the recorded driving parameter data; and generating a control signal for controlling the engine speed to be guided toward the desired engine speed upon completion of the gear change.

2. The method of claim 1, further comprising after generating the control signal, completing a gear change in the mechanical gear box.

3. The method of claim 2, further comprising after completing of the gear change, reconnecting the clutch and restoring the drive line with the engine operating.

4. The method of claim 1, wherein the driving parameter data are selected to include one or more of the group consisting of vehicle acceleration, vehicle speed, engine speed, power mobilization of the engine and torque extraction.

5. The method of claim 4, wherein the gear change is a downward gear change and a desired speed of the engine is an increased speed, as compared with the engine speed before disconnection of the clutch.

6. The method of claim 4, wherein the gear change is an upward gear change and the desired engine speed is reduced in a controlled manner, as compared with the engine speed before disconnection of the clutch.

7. The method of claim 4, wherein the gear change is a downward gear change and the engine speed before the break in the driveline and after the control signal is generated is substantially constant.

8. The method of claim 1, wherein the driving parameter data are selected to include one or more of the group consisting of vehicle acceleration, vehicle speed, engine speed, power mobilization of the engine and torque extraction.

9. The method of claim 1, wherein the gear change is an upward gear change and the desired engine speed is reduced in a controlled manner, as compared with the engine speed before disconnection of the clutch.

10. The method of claim 1, wherein the gear change is a downward gear change and the engine speed before the break in the driveline and after the control signal is generated is substantially constant.

11. An arrangement for controlling the engine speed of a combustion engine in a vehicle, wherein the vehicle includes a combustion engine, a mechanical gearbox operable for changing gears in an upward change and in a downward change, a driveline between the engine and the gearbox for driving the gearbox from the engine, the arrangement comprising:

a manually operable clutch incorporated in the driveline and selectively operable to break the driveline connection between the engine and the gearbox and restore the driveline connection;

a detector for detecting a break in the driveline upon disengagement of the clutch and for then generating a first signal indicative of the break in the driveline;

a control system operable for observing and recording driving parameter data of operation of the vehicle; the control system being activated by the first signal and being adapted to determine a desired engine speed intended upon completion of a gear change in the gear box, which desired engine speed is determined by the control system based on the driving parameter data;

the control system being operable to generate a control signal to act upon the engine for guiding the engine speed toward the desired speed.

12. The arrangement of claim 11, wherein the driving parameter data are selected to include one or more of the group consisting of vehicle acceleration, vehicle speed, engine speed, power mobilization of the engine and torque extraction.

13. The arrangement of claim 11, wherein when the mechanical gearbox is operated for a downward gear change, the control system is operable to set a desired engine speed that is to be increased, as compared with the engine speed before disconnection of the clutch.

14. The arrangement of claim 11, wherein when the mechanical gearbox is operated for an upward gear change, the control system is operable to cause the engine speed to be reduced in a controlled manner toward the desired speed, as compared with the engine speed before disconnection of the clutch.

15. The arrangement of claim 11, wherein when the mechanical gearbox is operated for a downward change, the control system is operable so that the engine speed is arranged to be substantially constant from the speed before the disconnection of the clutch and after disconnection of the clutch.

* * * * *